US010640987B2

(12) United States Patent
Stuart (10) Patent No.: US 10,640,987 B2
(45) Date of Patent: May 5, 2020

(54) COLUMN COVER REVEAL

(71) Applicant: FRY REGLET CORPORATION, Santa Fe Springs, CA (US)

(72) Inventor: Robert Stuart, Rome, GA (US)

(73) Assignee: FRY REGLET CORPORATION, Santa Fe Springs, CA (US)

( * ) Notice: Subject to any disclaimer, the term of this patent is extended or adjusted under 35 U.S.C. 154(b) by 0 days.

(21) Appl. No.: 15/843,265

(22) Filed: Dec. 15, 2017

(65) Prior Publication Data

US 2018/0202168 A1    Jul. 19, 2018

Related U.S. Application Data

(60) Provisional application No. 62/446,031, filed on Jan. 13, 2017.

(51) Int. Cl.
| | |
|---|---|
| *E04F 13/073* | (2006.01) |
| *E04F 13/076* | (2006.01) |
| *E04F 13/12* | (2006.01) |
| *E04F 13/08* | (2006.01) |
| *F16L 21/02* | (2006.01) |

(Continued)

(52) U.S. Cl.
CPC .......... *E04F 13/0736* (2013.01); *E02D 5/523* (2013.01); *E04F 13/076* (2013.01); *E04F 13/0803* (2013.01); *E04F 13/12* (2013.01); *F16L 21/022* (2013.01); *E04C 3/30* (2013.01); *E04C 3/32* (2013.01); *E04C 3/36* (2013.01); *E04F 2201/0517* (2013.01); *E04F 2203/02* (2013.01); *E04F 2290/00* (2013.01); *Y10T 403/55* (2015.01)

(58) Field of Classification Search
CPC . E04F 13/0736; E04F 13/076; E04F 13/0892; E04F 13/0898; E04F 13/09; E04F 13/12; E04F 2203/02; E04F 2201/0517; E04C 3/32; E04C 3/30; E04B 2/88; E04B 2/885; E04B 2/96; E04B 2/967; E04B 2/78; E02D 5/523; E02D 5/526; E04H 12/342; F16L 21/022; F16L 19/04; Y10T 403/55; Y10T 403/5733
USPC ......... 405/251, 252; 403/293, 305; 285/331, 285/398, 371; 52/223.5
See application file for complete search history.

(56) References Cited

U.S. PATENT DOCUMENTS

| | | | | |
|---|---|---|---|---|
| 973,670 A | * | 10/1910 | Kinnear | .................. E02D 27/42 |
| | | | | 52/223.5 |
| 1,607,725 A | * | 11/1926 | Davis | ...................... E02D 5/523 |
| | | | | 285/322 |

(Continued)

FOREIGN PATENT DOCUMENTS

| | | | | |
|---|---|---|---|---|
| DE | 1950269 A1 | * | 5/1971 | ............ F16L 21/022 |
| EP | 3290691 A1 | * | 3/2018 | ........... E04H 12/185 |
| NL | 9200072 A | * | 10/1992 | ............. E04D 3/366 |

*Primary Examiner* — Ryan D Kwiecinski
*Assistant Examiner* — Matthew J Gitlin
(74) *Attorney, Agent, or Firm* — Kilpatrick Townsend & Stockton LLP (57) ABSTRACT

A column cover system includes a first column skin, a second column skin, and a column joint vertically connecting the first column skin and the second column skin. The column joint includes at least one monolithic column joint portion that defines an upper retaining ring and a lower retaining ring. When assembled, the first column skin is seated within the upper retaining ring and the second column skin is seated within the lower retaining ring.

17 Claims, 7 Drawing Sheets

(51) Int. Cl.
*E02D 5/52* (2006.01)
*E04C 3/30* (2006.01)
*E04C 3/36* (2006.01)
*E04C 3/32* (2006.01)

(56) References Cited

U.S. PATENT DOCUMENTS

| | | | | | |
|---|---|---|---|---|---|
| 1,762,766 | A | * | 6/1930 | De Garay | E02D 5/523 285/331 |
| 2,211,375 | A | * | 8/1940 | Greulich | E02D 5/523 403/271 |
| 2,803,858 | A | * | 8/1957 | Rader | E04B 9/245 52/364 |
| 3,266,255 | A | * | 8/1966 | Dougherty | E02D 5/523 29/525 |
| 3,352,120 | A | * | 11/1967 | Pelzer | E02D 5/523 175/19 |
| 3,374,590 | A | * | 3/1968 | Kessler | E04F 13/0801 52/220.7 |
| 3,572,769 | A | * | 3/1971 | Lingl | F16L 13/11 285/369 |
| 3,592,491 | A | * | 7/1971 | Glover | F16L 21/022 277/625 |
| 3,653,688 | A | * | 4/1972 | Sakakibara | F16L 17/025 285/105 |
| 3,667,174 | A | * | 6/1972 | Arnett | E04B 1/6807 52/100 |
| 3,796,057 | A | * | 3/1974 | Dougherty | F16L 21/002 285/331 |
| 3,868,802 | A | * | 3/1975 | Schubach | E04B 2/58 29/450 |
| 4,099,749 | A | * | 7/1978 | van Vliet | F16L 21/002 285/398 |
| 4,574,548 | A | * | 3/1986 | Tupman | E04B 9/00 52/255 |
| 4,669,762 | A | * | 6/1987 | Jenkins | F16L 37/02 285/288.4 |
| 4,825,612 | A | * | 5/1989 | Tupman | E04F 19/062 52/288.1 |
| 5,213,374 | A | * | 5/1993 | Keating | F16L 21/022 228/17.5 |
| 5,470,112 | A | * | 11/1995 | Keating | F16L 23/024 285/24 |
| 5,477,643 | A | * | 12/1995 | Koenig, Jr. | E04F 13/06 52/100 |
| 6,289,646 | B1 | * | 9/2001 | Watanabe | E04F 13/0821 52/235 |
| D452,016 | S | * | 12/2001 | Hall | D25/121 |
| 6,494,501 | B2 | * | 12/2002 | Gotoh | F16L 13/103 285/21.3 |
| 7,159,370 | B2 | * | 1/2007 | Oliphant | E04C 3/30 52/845 |
| 8,683,766 | B2 | * | 4/2014 | Rutherford | E04B 1/64 52/364 |
| 2007/0163187 | A1 | * | 7/2007 | Price | E02D 29/025 52/169.12 |
| 2008/0250752 | A1 | * | 10/2008 | Bowman | E04C 3/32 52/848 |
| 2015/0089901 | A1 | * | 4/2015 | Chan | E04H 12/003 52/848 |
| 2017/0183837 | A1 | * | 6/2017 | Suzuki | E02D 5/24 |

* cited by examiner

COLUMN COVER REVEAL

REFERENCE TO RELATED APPLICATIONS

This application claims the benefit of U.S. Provisional Application No. 62/446,031, filed Jan. 13, 2017 and entitled COLUMN COVER REVEAL, the content of which is hereby incorporated by reference in its entirety.

FIELD OF THE INVENTION

This application relates to column cover assemblies, and more particularly to joints utilized with column cover assemblies.

BACKGROUND

In various environments, it may be desirable to cosmetically wrap or conceal structural beams, columns, other supports, or other elements with a cover. Due to the size of the column or structure to be covered, a cover may include a number of vertically connected column skins. However, the process of assembling such a cover is slow and expensive, and the column skins often become misaligned during installation. Therefore, there is a need for cover assemblies that are easy to install while maintaining proper alignment of the column skins.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a column cover system includes a first column skin, a second column skin, and a column joint vertically connecting the first column skin and the second column skin. In various examples, the column joint includes at least one monolithic column joint portion defining an upper retaining ring and a lower retaining ring, and the first column skin is seated within the upper retaining ring and the second column skin is seated within the lower retaining ring.

In some examples, the column joint portion includes a front surface, a retaining ledge having an upper retaining ledge surface and a lower retaining ledge surface, an upper retaining projection on the retaining ledge and spaced apart from the front surface, and a lower retaining projection on the retaining ledge and spaced apart from the front surface. In various embodiments, the front surface, upper retaining ledge surface, and the upper retaining projection define the upper retaining ring, and the front surface, lower retaining ledge surface, and the lower retaining projection define the lower retaining ring.

In certain aspects, the column joint portion includes a front surface, an upper retaining ledge having an upper retaining ledge surface, a lower retaining ledge having a lower retaining ledge surface and spaced apart from the upper retaining ledge such that a reveal is defined between the upper retaining ledge and the lower retaining ledge, an upper retaining projection on the upper retaining ledge and spaced apart from the front surface, and a lower retaining projection on the lower retaining ledge and spaced apart from the front surface. In certain embodiments, the front surface, upper retaining ledge surface, and the upper retaining projection define the upper retaining ring, and the front surface, lower retaining ledge surface, and the lower retaining projection define the lower retaining ring. In various embodiments, the upper retaining projection and the lower retaining projection extend toward the reveal. In some cases, the upper retaining projection and the lower retaining projection extend away from the reveal. In various examples, the reveal includes a reveal surface that is recessed relative to the front surface of the column joint portion.

In various embodiments, the at least one column joint portion comprises a plurality monolithic column joint portions configured to encompass a column. According to certain examples, the column joint further includes a first fastener securing the first column skin to a front surface of the column joint portion in the first retaining ring and a second fastener securing the second column skin to the front surface of the column joint portion in the second retaining ring. In certain aspects, a tensioning bracket is configured to apply pressure against the column joint portion.

According to some examples, a column joint for a column cover assembly includes a first monolithic column joint portion and a second monolithic column joint portion. In certain embodiments, the first column joint portion and the second column joint portion each include an upper retaining ring and a lower retaining ring, the upper retaining ring of the first column joint portion is aligned with the upper retaining ring of the second column joint portion and the lower retaining ring of the first column joint portion is aligned with the lower retaining ring of the second column joint portion, and the column joint portions are configured to seat a first column skin in the upper retaining rings and a second column skin in the lower retaining rings.

In various embodiments, each column joint portion includes a front surface, a retaining ledge having an upper retaining ledge surface and a lower retaining ledge surface, an upper retaining projection on the retaining ledge and spaced apart from the front surface, and a lower retaining projection on the retaining ledge and spaced apart from the front surface. According to certain examples, the front surface, upper retaining ledge surface, and the upper retaining projection define the upper retaining ring, and the front surface, lower retaining ledge surface, and the lower retaining projection define the lower retaining ring.

In certain aspects, each column joint portion includes a front surface, an upper retaining ledge having an upper retaining ledge surface, a lower retaining ledge having a lower retaining ledge surface and spaced apart from the upper retaining ledge such that a reveal is defined between the upper retaining ledge and the lower retaining ledge, an upper retaining projection on the upper retaining ledge and spaced apart from the front surface, and a lower retaining projection on the lower retaining ledge and spaced apart from the front surface. In various examples, the front surface, upper retaining ledge surface, and the upper retaining projection define the upper retaining ring, and the front surface, lower retaining ledge surface, and the lower retaining projection define the lower retaining ring. In certain cases, the reveal includes a reveal surface that is recessed relative to the front surface of the column joint portion. In various embodiments, a tensioning bracket is configured to apply pressure against the second column joint portion such that the second column joint portion is aligned with the first column joint portion.

According to certain examples, a method of assembling a column cover system includes assembling a monolithic column joint portion into a column joint, seating a first column skin within an upper retaining ring defined by the column joint portion, and seating a second column skin within a lower retaining ring defined by the column joint portion such that the second column skin is vertically connected to the first column skin through the column joint.

In various embodiments, seating the first column skin includes seating the first column skin on an upper retaining ledge surface and adjacent to a front surface of the column joint portion, and seating the second column skin includes seating the second column skin on a lower retaining ledge surface and adjacent to the front surface of the column joint portion. In some embodiments, the upper retaining ledge surface and the lower retaining ledge surface are defined by a retaining ledge. In various embodiments, the upper retaining ledge surface is defined by an upper retaining ledge and the lower retaining ledge surface is defined by a lower retaining ledge, and a reveal is defined between the upper retaining ledge and the lower retaining ledge such that the reveal is vertically between the first column skin and the second column skin when the first column skin is seated in the upper retaining ring and the second column skin is seated in the lower retaining ring.

In certain cases, the method includes adjusting a shape of the column joint portion by adjusting a tensioning bracket. In some aspects, the method includes securing the first column skin to a front surface of the column joint portion with a first fastener and securing the second column skin to the front surface of the column joint portion with a second fastener.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "left," "right," "front," and "back," among others are intended to refer to the orientation as illustrated and described in the figure (or figures) to which the components and directions are referencing.

Figure 1:
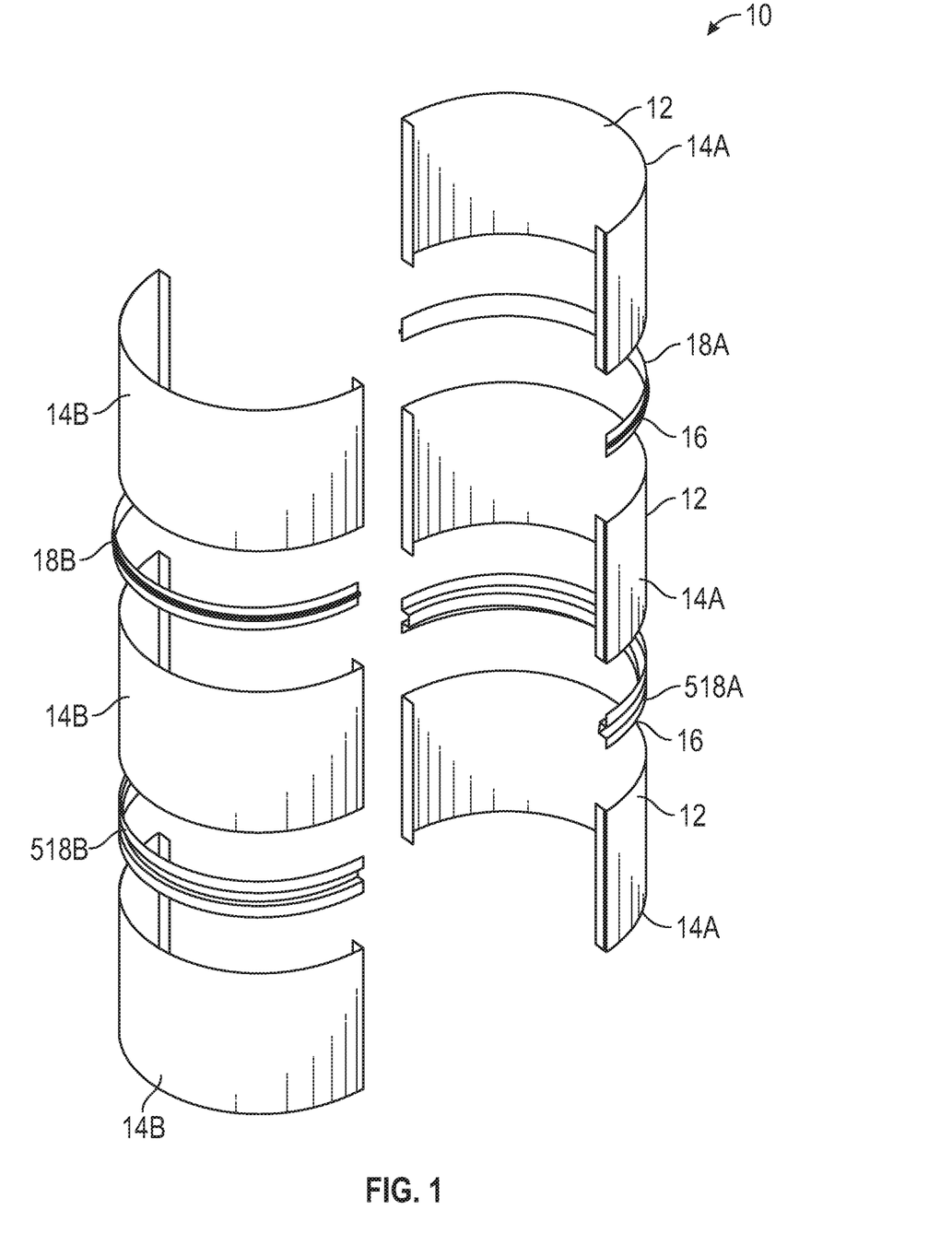
FIG. 1 is an exploded assembly view of a column cover assembly according to aspects of the present disclosure.

FIG. 1 illustrates an example of a column cover assembly 10. The column cover assembly 10 generally includes one or more column skins 12 that extend around a column when assembled. The number of column skins 12 necessary to cover a column will depend on the particular geometries of the column and the column skins and should not be considered limiting on the current disclosure. Each column skin 12 may be constructed from various materials and may be adapted to work in particular environments. As some non-limiting examples, the column skins 12 may have metal finishes (e.g. aluminum, stainless steel, galvanized steel, etc.), custom finishes and/or custom colors. The column skins 12 may also be adaptable for power, data, lighting, signage and specialty technology, among others. The column skins 12 may have any suitable shape and may be customized depending on particular application.

As illustrated in FIG. 1, in some cases, each column skin 12 includes multiple skin portions (e.g., skin portions 14A and 14B), that collectively wrap around a column so as to cover the column. The number of skin portions 14 forming one column skin 12 should not be considered limiting on the current disclosure. For example, the column skin 12 may be formed as a unitary component or formed from a plurality of skin portions 14.

Due to the size of the column or structure to be covered by the column cover assembly 10, a number of column skins 12 are vertically connected through column joints. A column joint is traditionally constructed from multiple pieces of material that are formed so as to fit together to form the joint. The process of forming the different joint pieces and fitting the joint pieces together is slow, expensive, and can cause problems with alignment of the column skins 12 during installation.

In view of the problems with traditional column joints, the column cover assembly 10 includes column joints 16. The column joints 16 may be customized and specific to a column, although they need not be. The column joints 16 may vary in width opening, material type, and finish, as described below. Each column joint 16 includes column joint portions 18A-B. In other examples, the column joint includes column joint portions 518A-B (or column joint portions 1118A). The number of column joint portions 18 forming the column joint 16 should not be considered limiting on the current disclosure. Each column joint portion 18, 518 is formed as a unitary or monolithic component, such as through extrusion of aluminum, although various other materials and various other forming processes for making the unitary column joint portion 18, 518 may be used. The column joint 16 may be customized to have various finishes, including, but not limited to, clear anodized, black anodized, powder coated, kynar coated, chemical film, and various other finishes depending on application.

Figure 2:
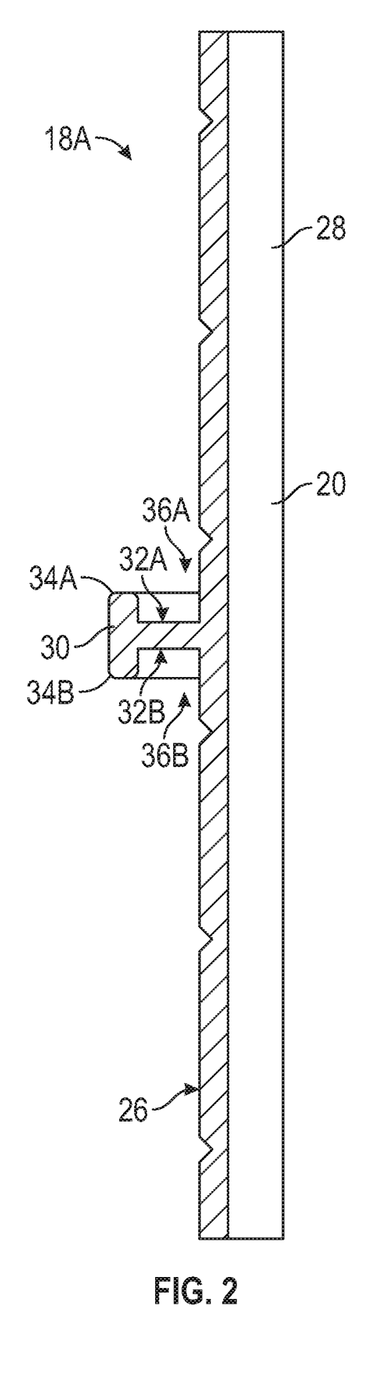
FIG. 2 is a sectional view of a column joint of the column cover assembly of FIG. 1 according to aspects of the present disclosure.
Figure 3:
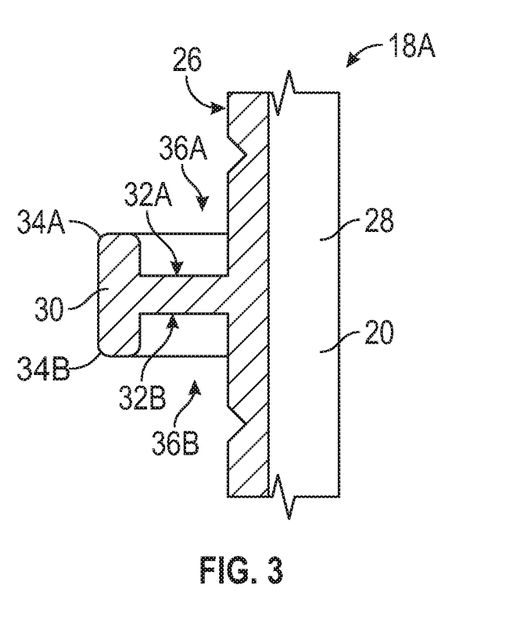
FIG. 3 is an enlarged sectional view of a portion of the column joint of FIG. 2.
Figure 4:
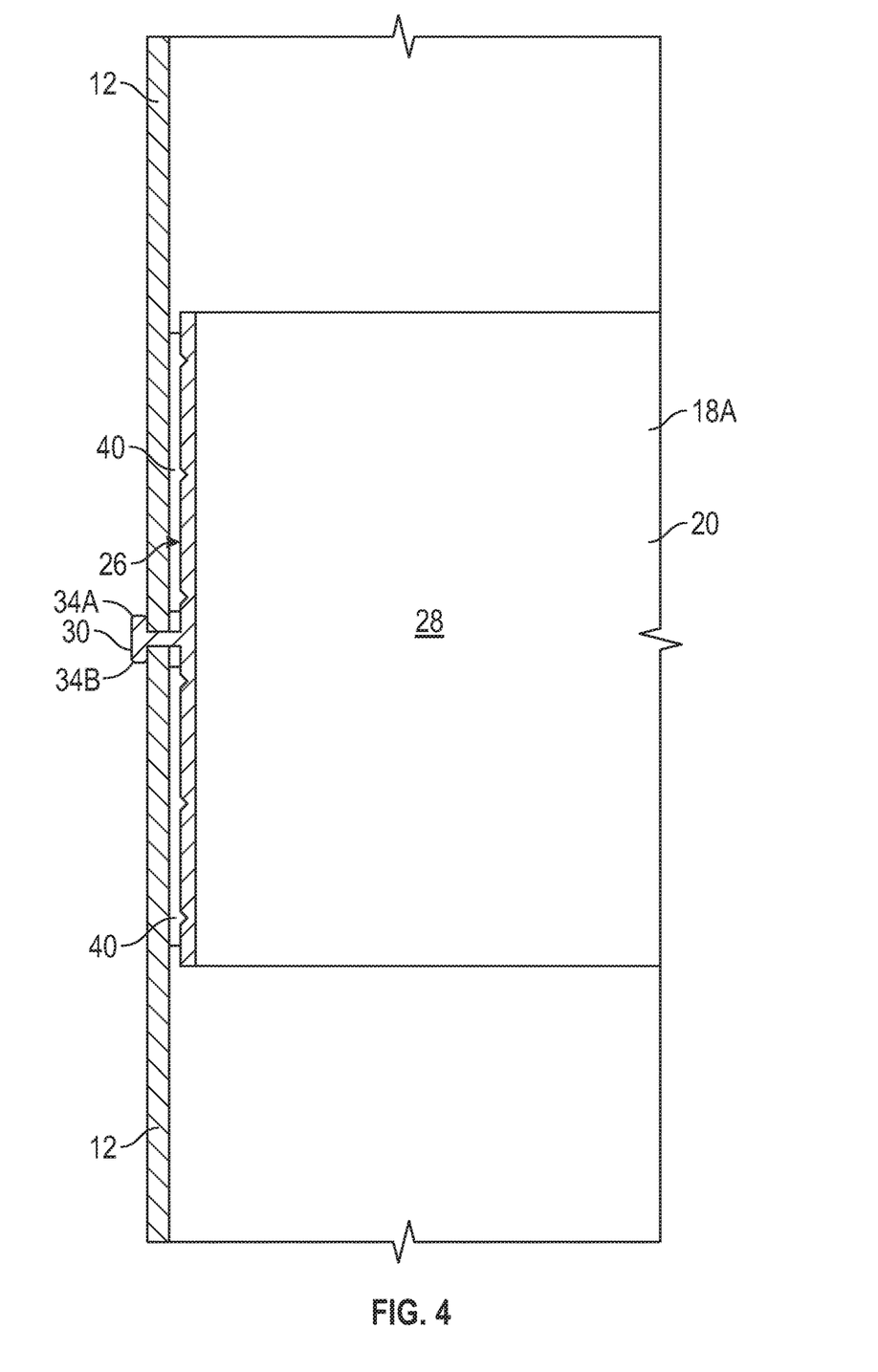
FIG. 4 is a sectional view of the column joint of FIG. 2 with two column skins of the column cover assembly of FIG. 1 according to aspects of the present disclosure.

FIGS. 2-4 illustrate a first embodiment of a column joint portion 18A of the column joint 16. Reference is made to the column joint portion 18A, although it will be appreciated that the description is equally applicable to the column joint portion 18B. The column joint portion 18A includes a body 20 having a front surface 26, a back surface 28, and a retaining ledge 30 that extends from the front surface 26 of the body 20. The retaining ledge 30 includes retaining ledge surfaces 32A-B. The front surface 26 and retaining ledge surfaces 32A-B define upper and lower retaining rings 36A-B, respectively. In some examples, the retaining ledge 30 optionally includes at least one retaining projection 34A and/or 34B that is spaced apart from the front surface 26 of the body 20. In will be appreciated that in various examples, any number of retaining projections may be provided. In the illustrated embodiment, the projections 34A-B extends along the distal edge of the retaining ledge 30, but it could be provided at any location along the length of the ledge 30. In the present example, the upper projection 34A extends upwardly from retaining ledge 30, and the lower projection 34B extends downwardly from retaining ledge 30. In these examples, the upper and lower projections 34A-B may aid in forming the retaining rings 36A-B. In other examples, the retaining ledge projections 34A-B may be omitted.

Referring to FIG. 4, to assemble and install the column skins 12 with the column joint portion 18A, column skins 12 are seated within retaining rings 36A-B, respectively. Resting the column skins 12 within the retaining rings 36A-B may ensure proper alignment of the column skins 12 (see, e.g., FIG. 4). As illustrated in FIG. 4, the retaining ledge projections 34A-B may ease installation of the column skins 12 within the retaining rings 36A-B, respectively, and help ensure a tight fit between the column skins 12 and the column joint portion 18A.

In various examples, the column skins 12 may optionally be secured to the column joint portion 18A through various suitable mechanisms including, but not limited to screws, nuts and bolts, pins, other mechanical fasteners, various adhesives or glues such as epoxy, various tapes such as VHB tape, various bonding agents, or various other mechanisms. The fasteners may further be provided to help retain the shape of the column cover assembly 10 and to increase structural integrity of the column cover assembly 10. In the present example, VHB tape 40 is provided between an inner surface of the column skins 12 and the front surface 26 of the column joint portion 18A to secure the column skins 12 to the column joint portion 18A.

FIGS. 5-10 illustrate an example of a column joint portion 518A of a column joint 16 to be interposed between two adjacent column skins 12. Reference is made to the column joint portion 518A, although it will be appreciated that the description is equally applicable to the column joint portion 518B. Column joint portion 518A in FIGS. 5-10 is structurally similar to the column joint portion 18A in FIGS. 2-4 and thus the same reference numbers are used to refer to the same structure. Unlike the embodiment of FIGS. 2-4, however, column joint portion 518A of FIGS. 5-10 defines a reveal 538 between an upper retaining ledge 530A and a lower retaining ledge 530B.

Figures 5, 6:
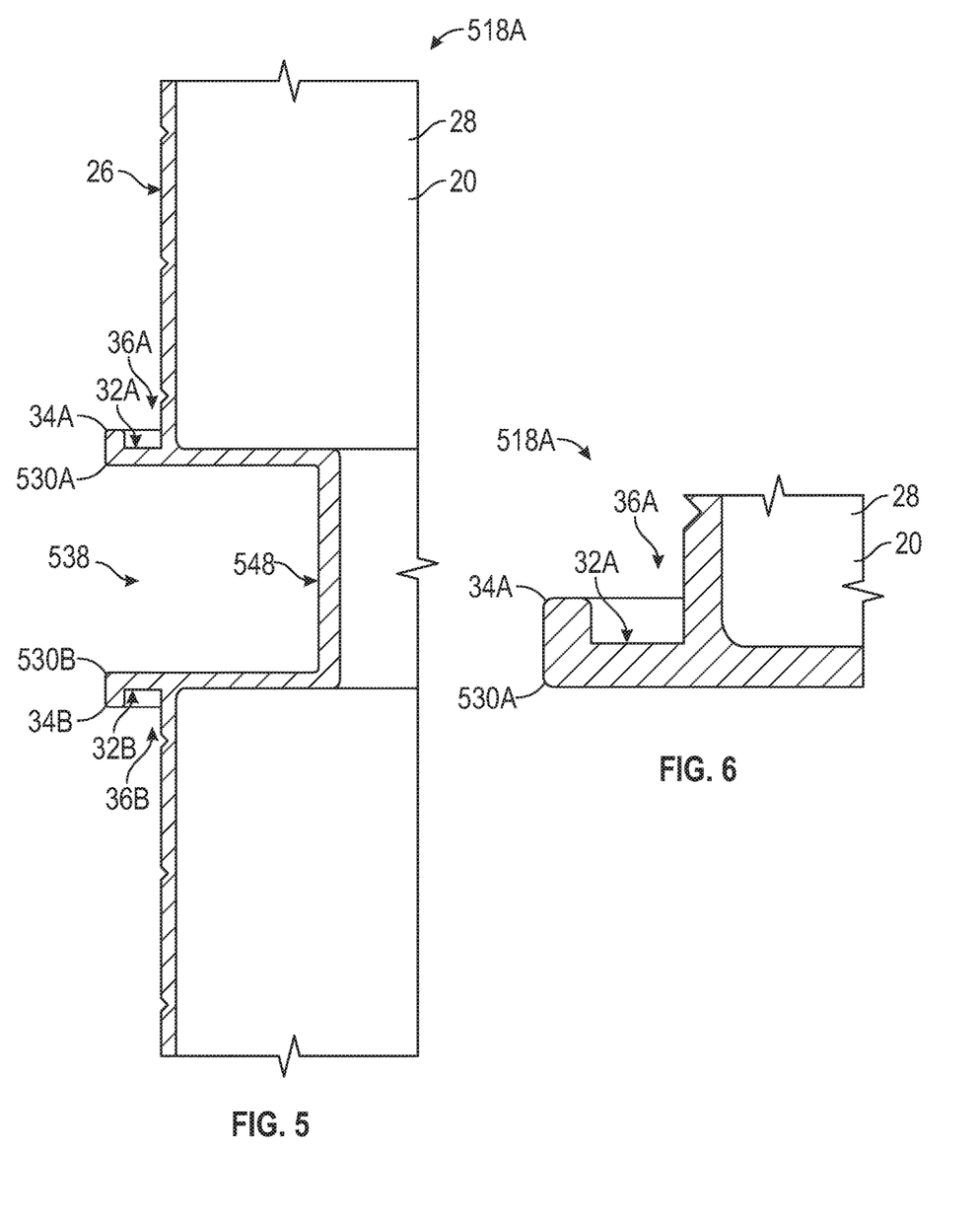
FIG. 5 is a sectional view of another column joint of the column cover assembly of FIG. 1.
FIG. 6 is an enlarged sectional view of a portion of the column joint of FIG. 5.

Traditional joints having reveals are fabricated from several pieces that create the reveal—a curved vertical section that is welded, glued, or taped to separate curved top and bottom horizontal sections to create the reveal assembly. In the present embodiment, the column joint portion 518A is a unitarily (monolithically) formed or continuously formed component defining the reveal 538. For example, in some embodiments, the column joint portion 518A may be an extruded section of aluminum that creates the reveal 538.

Figure 7:
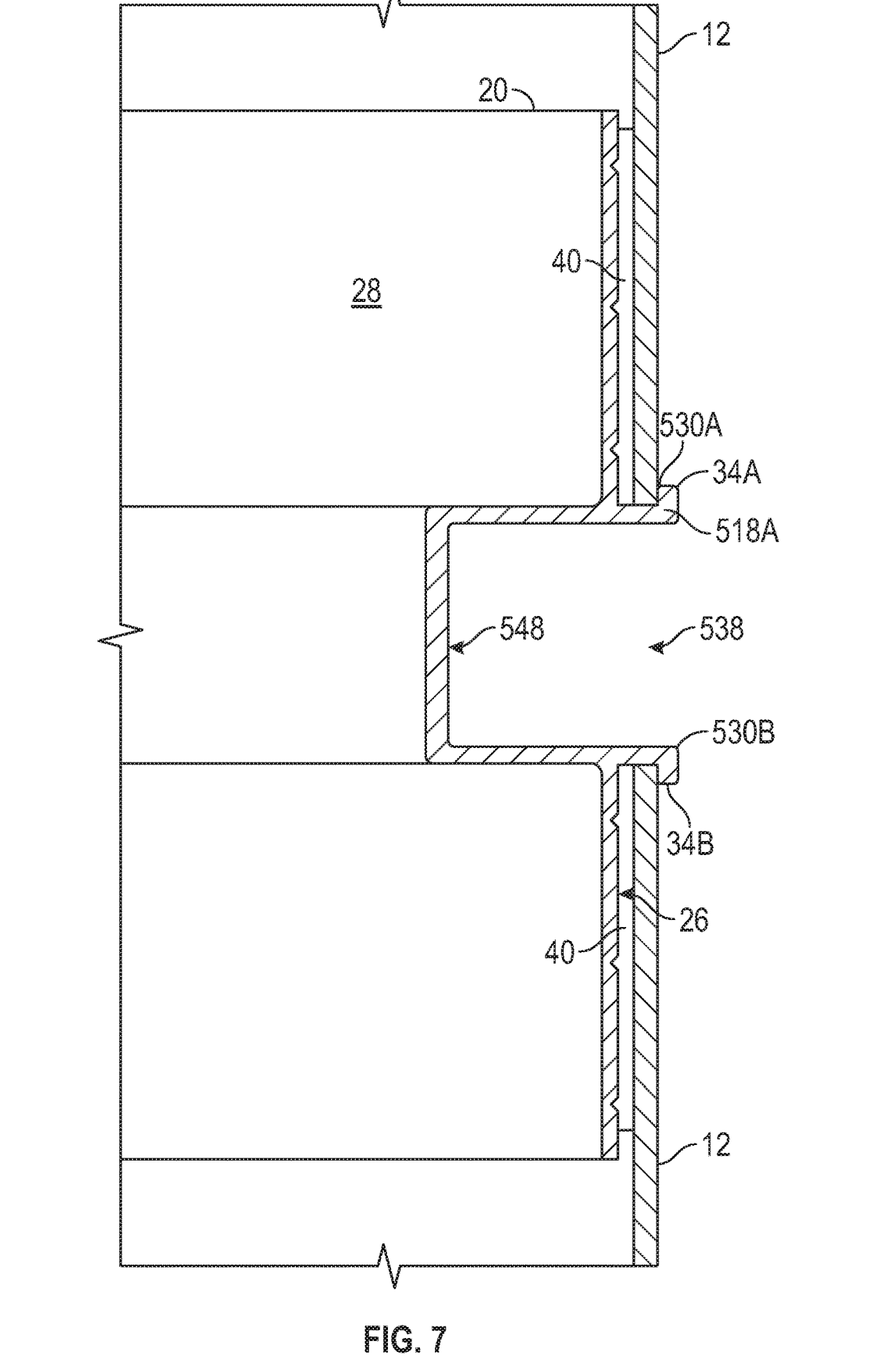
FIG. 7 is a sectional view of the column joint of FIG. 5 with two column skins of the column cover assembly of FIG. 1 according to aspects of the present disclosure.
Figure 8:
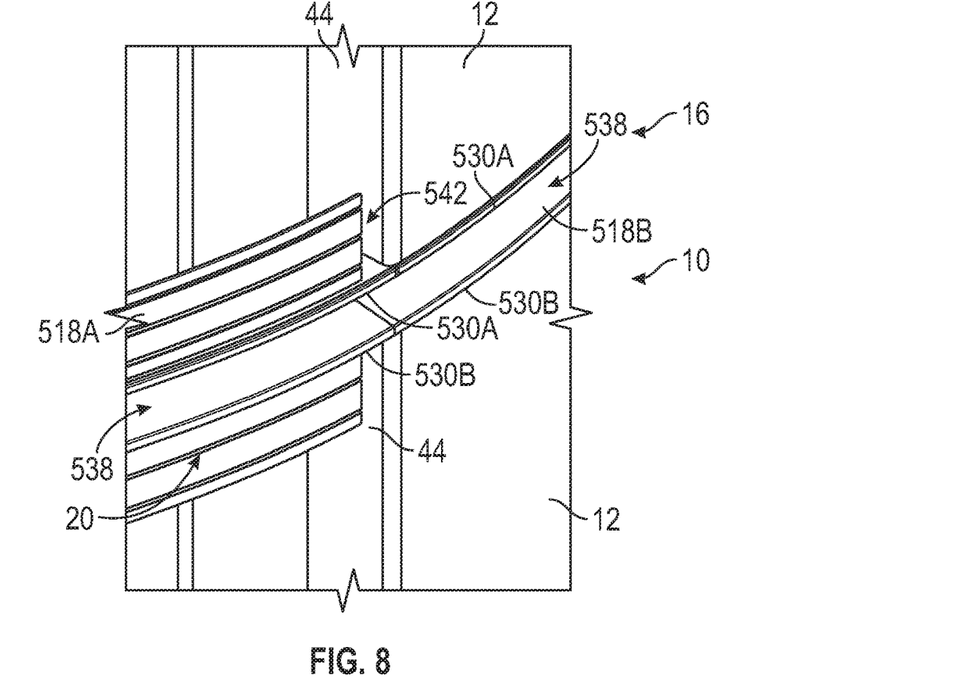
FIG. 8 is a perspective view of a portion of the column joint and column skins of FIG. 7.
Figure 9:
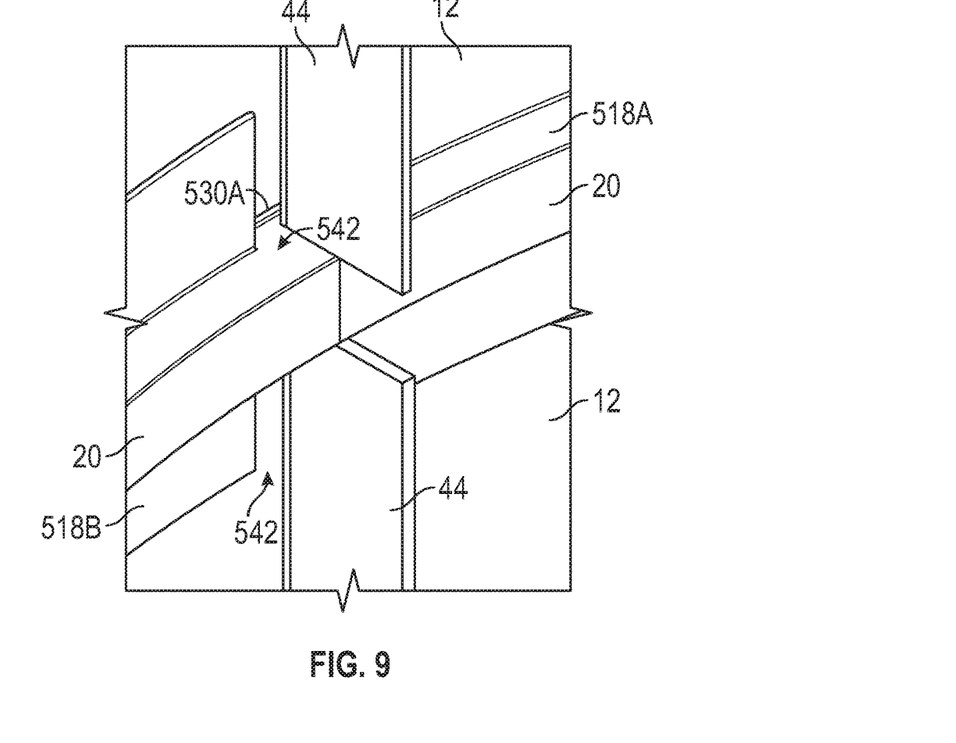
FIG. 9 is another perspective view of a portion of the column joint and column skins of FIG. 7.

The reveal 538 includes a reveal surface 548 that is recessed relative to the front surface 26. In various applications, the reveal 538 may be provided to accept and retain various material inserts on the column joint portion 518A. The material inserts may be constructed from the same material used to construct the column joint portion 18A or from a different material. As a non-limiting example, a material insert formed from brass (and having any desired shape) may be formed that would be inserted into the reveal 538. Various other materials may be used for the material insert. In these examples with the reveal 538, the column joint portion 518A includes the upper retaining ledge 530A and the lower retaining ledge 530B. The upper retaining ledge 530A defines the retaining ring 36A and the lower retaining ledge 530B defines the retaining ring 36B. As illustrated in FIGS. 7 and 8, the column skins 12 are mounted on the column joint portions 518A-B so as to seat on the upper and lower retaining ledges 530A-B.

In some embodiments, the column joint portions 518A-B (and/or column joint portions 18A-B) may be configured such that, when they are coupled around a column, gaps 542 are created between the ends of the column joint portions 518A-B above and below retaining ledge 30 (in the embodiment of FIGS. 2-4) and upper and lower retaining ledges 530A-B (in the embodiment of FIGS. 5-11). The gaps 542 may be provided to accommodate side flanges 44 of the column skins 12 that extend toward the column when installed (best seen in FIGS. 8 and 9). In other embodiments, the gaps 542 may be omitted.

Figure 10:
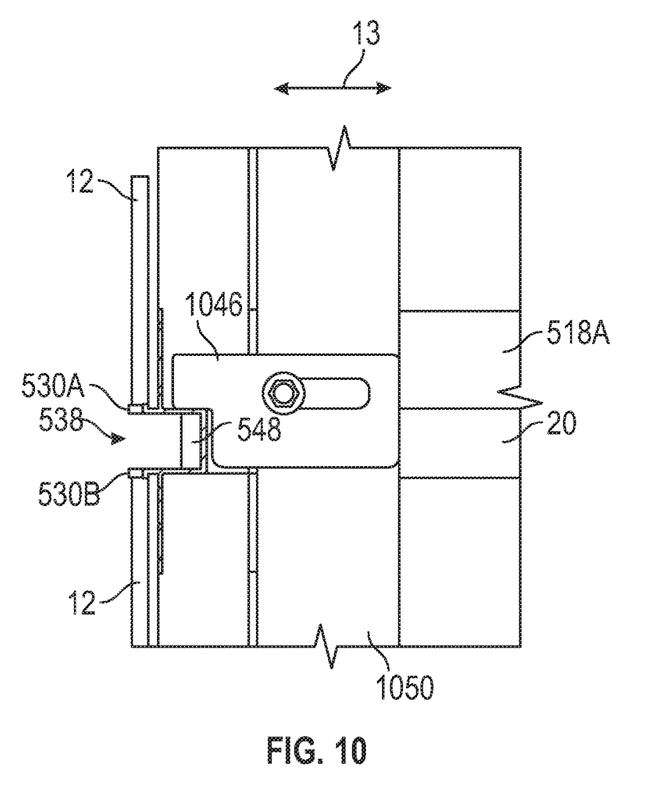
FIG. 10 is a side view of a portion of the column joint and column skins of FIG. 7.

In some embodiments, as illustrated in FIG. 10, a tensioning bracket 1046 may be provided to apply pressure against the column joint 16 (in the illustrated embodiment, more specifically against column joint portions 518A-B) to assist with installation of the column cover assembly 10 and to impart structural integrity to the construct. In certain examples, adjusting the tensioning bracket 1046 may adjust a shape of one or more of the column joint portions 518A-B. In various examples, applying pressure to one or more column joint portions 518A-B may bias at least a portion of the joint portion 518A-B outwards or inwards relative. For example, in FIG. 10, the tensioning bracket 1046 may generally move in the direction indicated by arrow 13. Optionally, the tensioning bracket 1046 is movable between an innermost position (where the pressure applied against the column joint portions 518A-B is minimized or reduced and/or the shape and/or position of the joint portions 518A-B is minimally changed (if at all)) and an outermost position (where the pressure applied is maximized and/or the shape and/or position of the joint portions 518A-B is changed the most). FIG. 10 illustrates the tensioning bracket 1046 in the innermost position. The tensioning bracket 1046 may be provided on a post 1050 or other component of the column cover assembly 10. Because formed metal typically has a memory to it, the column skins 12 may have a tendency to expand into an oval shape rather than a round shape. The tensioning bracket 1046 may therefore be utilized to maintain the desired shape of the column skins 12 (e.g. in a round shape or other shape), secure the column skins 12 in place, and align abutting sections of the column skins 12 together.

Figure 11:
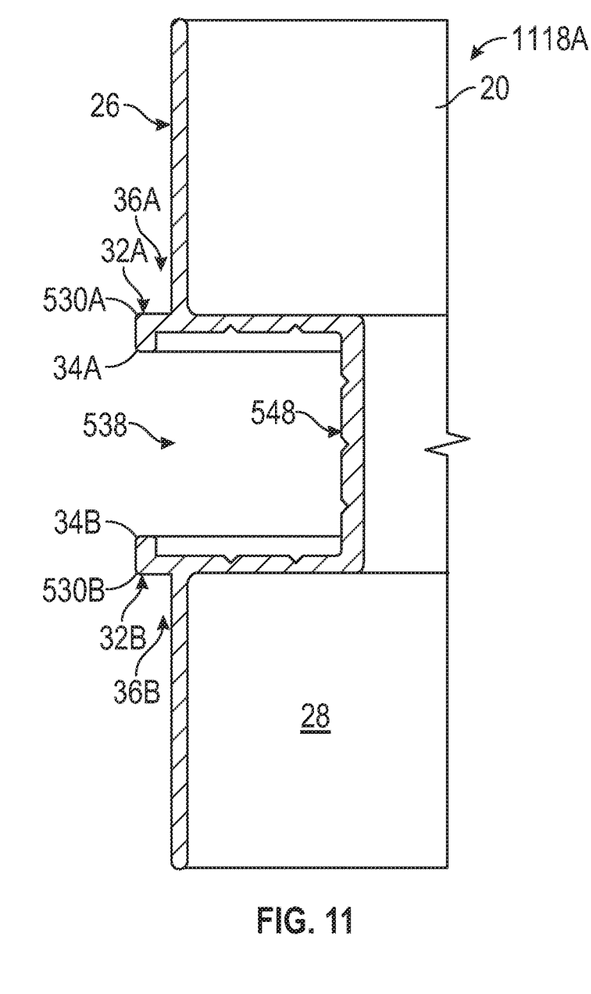
FIG. 11 is a sectional view of another column joint that may be used with the column cover assembly of FIG. 1 according to aspects of the present disclosure.

FIG. 11 illustrates another embodiment of a column joint portion 1118A of a column joint 16 that includes a reveal 538 and is structurally similar to the column joint portion 518A of FIGS. 5-10. However, unlike the column joint portion 518A of FIGS. 5-10 whereby upper and lower projection portions 34A-B extend away from the reveal 538, in the embodiment of the column joint portion 1118A of FIG. 11, upper and lower projection portions 34A-B extend toward the reveal 538 and can aid in positioning and retaining the various inserts at least partially within the reveal 538.

The column joint portions 18A, 518A, and 1118A are shown as being semi-circular so as to each extend around half of the diameter of a column. However, more than two column joint portions may be provided. Moreover, the column joint portions 18A, 518A, and 1118A may be formed so as to assume cross-sectional shapes other than a circle when coupled, including but not limited to square, triangular, oval, etc.

A method of forming the column joint 16 includes providing a blank of material and extruding the blank to have a column joint 16 profile such as that of the column joint portion 18A (shown in FIG. 2), the column joint portion 518A (shown in FIG. 5), and/or the column joint portion 1118A (shown in FIG. 11). The method further includes cutting the blank into segments of the desired length and shaping the segments to form unitary column joint portions of the desired shape. In some examples, the blank of material comprises aluminum, although in other examples, the blank of materials may comprise other materials suitable for the column joint portions.

A method of installing the column cover assembly 10 is also provided. In various examples, installing the column cover assembly 10 includes positioning a lower column skin 12 relative to the column joint 16 by positioning at least a portion of the lower column skin 12 within the retaining rings 36B defined by the column joint portions 18A-B. An upper column skin 12 is positioned relative to the column joint 16 by positioning at least a portion of the upper column skin 12 within the retaining rings 36A defined by the column joint portions 18A-B.

The method may also include securing the upper and lower column skins 12 to the column joint 16 through a securing mechanism. In some examples, the securing mechanism includes an epoxy or VHB tape 40 positioned between the upper and lower column skins 12 and the front surface 26 of the column joint portions 18A-B. In some examples, the method may further include applying pressure to the column joint 16 with the tensioning bracket 46 to assist with installation and to provide structural integrity.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims which follow, they are used only in a generic and descriptive sense, and not for the purposes of limiting the described invention, nor the claims which follow.

That which is claimed:

1. A column cover system for a column, the system comprising:
   a first column skin comprising an inner surface and an outer surface;
   a second column skin comprising an inner surface and an outer surface; and
   a column joint vertically connecting the first column skin and the second column skin, wherein the column joint comprises at least one monolithic column joint portion comprising:
      a body having an outer surface, an inner surface, an upper end and a lower end opposite from the upper end;
      an upper retaining ring extending outwardly from the outer surface of the body between the upper end and the lower end, wherein the first column skin is seated within the upper retaining ring, and wherein the upper retaining ring comprises an upper ledge surface that is substantially perpendicular to the outer surface of the body;
      a lower retaining ring extending outwardly from the outer surface of the body between the upper retaining ring and the lower end, wherein the second column skin is seated within the lower retaining ring, and wherein the lower retaining ring comprises a lower ledge surface that is substantially perpendicular to the outer surface of the body;
      a first fastener positioned on the outer surface of the body between the upper retaining ring and the upper end of the body, wherein the first fastener secures the first column skin to the body; and
      a second fastener positioned on the outer surface of the body between the lower retaining ring and the lower end of the body, wherein the second fastener secures the second column skin to the body and further comprising a tensioning bracket configured to apply pressure against the column joint portion such that a shape of the column joint portion is adjustable in a lateral direction.

2. The column cover system of claim 1, wherein the column joint portion further comprises:
   a retaining ledge having an upper retaining ledge surface and a lower retaining ledge surface;
   an upper retaining projection on the retaining ledge that extends at an angle from the upper retaining ledge surface and that is spaced apart from the outer surface of the body; and
   a lower retaining projection on the retaining ledge that extends at an angle from the lower retaining ledge surface and that is spaced apart from the outer surface of the body, wherein the outer surface of the body, the upper retaining ledge surface, and the upper retaining projection define the upper retaining ring, and wherein the outer surface of the body, the lower retaining ledge surface, and the lower retaining projection define the lower retaining ring.

3. The column cover system of claim 1, wherein the column joint portion further comprises:

an upper retaining ledge having an upper retaining ledge surface;

a lower retaining ledge having a lower retaining ledge surface and spaced apart from the upper retaining ledge such that a reveal is defined between the upper retaining ledge and the lower retaining ledge;

an upper retaining projection on the upper retaining ledge that extends at an angle from the upper retaining ledge surface and that is spaced apart from the outer surface of the body; and a lower retaining projection on the lower retaining ledge that extends at an angle from the lower retaining ledge surface and that is spaced apart from the outer surface of the body, wherein the outer surface of the body, the upper retaining ledge surface, and the upper retaining projection define the upper retaining ring, and wherein the outer surface of the body, the lower retaining ledge surface, and the lower retaining projection define the lower retaining ring.

4. The column cover system of claim 3, wherein the upper retaining projection and the lower retaining projection extend toward the reveal.

5. The column cover system of claim 3, wherein the upper retaining projection and the lower retaining projection extend away from the reveal.

6. The column cover system of claim 3, wherein the reveal comprises a reveal surface that is recessed relative to the outer surface of the body of the column joint portion.

7. The column cover system of claim 1, wherein the at least one column joint portion comprises a plurality of monolithic column joint portions configured collectively to encompass the column.

8. The column cover system of claim 1, wherein the tensioning bracket is further configured to apply pressure against the column joint portion in a direction substantially perpendicular to the outer surface of the body.

9. A column cover system comprising:

a column skin comprising a skin body and a side flange extending at an angle relative to the skin body; and at least one monolithic column joint portion, wherein the at least one monolithic column joint portion comprises:

a joint body comprising an inner surface, an outer surface, a first side edge, and a second side edge opposite from the first side edge, wherein a distance from the first side edge to the second side edge is a width of the joint body; and at least one retaining ledge extending outwardly from the outer surface of the joint body and comprising at least one retaining ring, a first side edge, and a second side edge opposite from the first side edge, wherein the first side edge of the at least one retaining ledge is proximate to the first side edge of the joint body and the second side edge of the at least one retaining ledge is proximate to the second side edge of the joint body, and wherein a distance from the first side edge of the at least one retaining ledge to the second side edge of the at least one retaining ledge is a width of the at least one retaining ledge, wherein the width of the at least one retaining ledge is greater than the width of the joint body such that a gap is defined between the first side edge of the at least one retaining ledge and the first side edge of the joint body, and wherein the column skin is positioned relative to the at least one monolithic column joint portion such that at least a portion of the skin body is received within the at least one retaining ring and the side flange of the column skin extends into the gap.

10. The column cover system of claim 9, wherein at least one retaining ring comprises an upper retaining ring and a lower retaining ring, wherein the at least one retaining ledge comprises an upper retaining ledge surface and a lower retaining ledge surface, and wherein the at least one monolithic column joint portion comprises:

an upper retaining projection on the at least one retaining ledge that extends at an angle relative to the upper retaining ledge surface and that is spaced apart from the outer surface of the joint body; and a lower retaining projection on the retaining ledge that extends at an angle relative to the lower retaining ledge surface and that is spaced apart from the outer surface of the joint body, wherein the outer surface of the joint body, the upper retaining ledge surface, and the upper retaining projection define the upper retaining ring, and wherein the outer surface of the joint body, the lower retaining ledge surface, and the lower retaining projection define the lower retaining ring.

11. The column cover system of claim 9, wherein:

the at least one retaining ring comprises an upper retaining ring and a lower retaining ring;

the at least one retaining ledge comprises an upper retaining ledge having an upper retaining ledge surface and a lower retaining ledge having a lower retaining ledge surface, wherein the lower retaining ledge is spaced apart from the upper retaining ledge such that a reveal is defined between the upper retaining ledge and the lower retaining ledge;

the at least one monolithic column joint portion further comprises:

an upper retaining projection on the upper retaining ledge that extends at an angle relative to the upper retaining ledge surface and that is spaced apart from the outer surface of the joint body; and a lower retaining projection on the lower retaining ledge that extends at an angle relative to the lower retaining ledge surface and that is spaced apart from the outer surface of the joint body, the outer surface of the joint body, the upper retaining ledge surface, and the upper retaining projection define the upper retaining ring, and the outer surface of the joint body, the lower retaining ledge surface, and the lower retaining projection define the lower retaining ring.

12. The column cover system of claim 11, wherein the reveal comprises a reveal surface that is recessed relative to the outer surface of the joint body.

13. The column cover system of claim 9, further comprising a tensioning bracket configured to apply pressure against the at least one monolithic column joint portion such that a shape of the at least one monolithic column joint portion is adjustable in a lateral direction.

14. The column cover system of claim 1, wherein:
the body of the at least one monolithic column cover joint portion comprises a first side edge and a second side edge opposite from the first side edge;
a distance from the first side edge of the body to the second side edge of the body is a width of the body;
the at least one monolithic column cover joint portion comprises a retaining ledge extending outwardly from the outer surface of the body;
the retaining ledge at least partially defines the upper retaining ring and comprises a first side edge and a second side edge opposite from the first side edge;
a distance from the first side edge of the retaining ledge to the second side edge of the retaining ledge is a width of the retaining ledge; and
the width of the retaining ledge is greater than the width of the body such that a gap is defined between the first side edge of the retaining ledge and the first side edge of the body.

15. The column cover system of claim 14, wherein the first column skin comprises a column skin body and a side flange that extends at an angle relative to the column skin body, wherein a portion of the column skin body of the first column skin is positioned within the upper retaining ring, and wherein the side flange of the first column skin extends into the gap.

16. A column cover system for a column, the system comprising:
a first column skin comprising an inner surface and an outer surface;
a second column skin comprising an inner surface and an outer surface; and
a column joint vertically connecting the first column skin and the second column skin, wherein the column joint comprises at least one monolithic column joint portion comprising:
a body having an outer surface, an inner surface, an upper end and a lower end opposite from the upper end;
an upper retaining ring extending outwardly from the outer surface of the body between the upper end and the lower end, wherein the first column skin is seated within the upper retaining ring;
a lower retaining ring extending outwardly from the outer surface of the body between the upper retaining ring and the lower end, wherein the second column skin is seated within the lower retaining ring;
a first fastener positioned on the outer surface of the body between the upper retaining ring and the upper end of the body, wherein the first fastener secures the first column skin to the body; and
a second fastener positioned on the outer surface of the body between the lower retaining ring and the lower end of the body, wherein the second fastener secures the second column skin to the body,
wherein the column joint portion further comprises:
an upper retaining ledge having an upper retaining ledge surface;
a lower retaining ledge having a lower retaining ledge surface and spaced apart from the upper retaining ledge such that a reveal is defined between the upper retaining ledge and the lower retaining ledge;
an upper retaining projection on the upper retaining ledge that extends at an angle from the upper retaining ledge surface and that is spaced apart from the outer surface of the body; and
a lower retaining projection on the lower retaining ledge that extends at an angle from the lower retaining ledge surface and that is spaced apart from the outer surface of the body,
wherein the outer surface of the body, the upper retaining ledge surface, and the upper retaining projection define the upper retaining ring,
wherein the outer surface of the body, the lower retaining ledge surface, and the lower retaining projection define the lower retaining ring, and
wherein the reveal comprises a reveal surface that is recessed relative to the outer surface of the body of the column joint portion.

17. A column cover system for a column, the system comprising:
a first column skin comprising an inner surface and an outer surface;
a second column skin comprising an inner surface and an outer surface; and
a column joint vertically connecting the first column skin and the second column skin, wherein the column joint comprises at least one monolithic column joint portion comprising:
a body having an outer surface, an inner surface, an upper end and a lower end opposite from the upper end;
an upper retaining ring extending outwardly from the outer surface of the body between the upper end and the lower end, wherein the first column skin is seated within the upper retaining ring;
a lower retaining ring extending outwardly from the outer surface of the body between the upper retaining ring and the lower end, wherein the second column skin is seated within the lower retaining ring;
a first fastener positioned on the outer surface of the body between the upper retaining ring and the upper end of the body, wherein the first fastener secures the first column skin to the body; and
a second fastener positioned on the outer surface of the body between the lower retaining ring and the lower end of the body, wherein the second fastener secures the second column skin to the body,
wherein:
the body of the at least one monolithic column cover joint portion comprises a first side edge and a second side edge opposite from the first side edge;
a distance from the first side edge of the body to the second side edge of the body is a width of the body;
the at least one monolithic column cover joint portion comprises a retaining ledge extending outwardly from the outer surface of the body;
the retaining ledge at least partially defines the upper retaining ring and comprises a first side edge and a second side edge opposite from the first side edge;
a distance from the first side edge of the retaining ledge to the second side edge of the retaining ledge is a width of the retaining ledge; and
the width of the retaining ledge is greater than the width of the body such that a gap is defined between the first side edge of the retaining ledge and the first side edge of the body.

\* \* \* \* \*